(12) United States Patent
Fisher et al.

(10) Patent No.: US 9,384,181 B2
(45) Date of Patent: Jul. 5, 2016

(54) GENERATING CUSTOMIZED DATA BOUND VISUALIZATIONS

(75) Inventors: Danyel Fisher, Seattle, WA (US); Steven Mark Drucker, Bellevue, WA (US); Roland Fernandez, Woodinville, WA (US); Vikram Bapat, Seattle, WA (US); Robert Scott Silverstein, Seattle, WA (US); Xiaoji Chen, Cambridge, MA (US); Anson An-Chun Tsao, Redmond, WA (US); Oscar Pawel Kozlowski, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 956 days.

(21) Appl. No.: 12/972,562

(22) Filed: Dec. 20, 2010

(65) Prior Publication Data

US 2012/0159298 A1 Jun. 21, 2012

(51) Int. Cl.
*G06F 17/00* (2006.01)
*G06F 17/24* (2006.01)
*G06T 11/20* (2006.01)
*G06F 17/21* (2006.01)

(52) U.S. Cl.
CPC ............ *G06F 17/246* (2013.01); *G06F 17/211* (2013.01); *G06T 11/206* (2013.01)

(58) Field of Classification Search
CPC ..... G06F 17/246; G06F 17/20; G06F 17/211; G06T 11/206
USPC .......................................... 715/212, 215, 207
See application file for complete search history.

(56) References Cited

U.S. PATENT DOCUMENTS

| | | | | |
|---|---|---|---|---|
| 7,212,208 | B2 * | 5/2007 | Khozai | 345/440 |
| 7,729,875 | B2 * | 6/2010 | Iwamura et al. | 702/94 |
| 2006/0253356 | A1 * | 11/2006 | Charles et al. | 705/35 |
| 2007/0022000 | A1 | 1/2007 | Bodart et al. | |
| 2007/0101252 | A1 * | 5/2007 | Chamberlain et al. | 715/503 |
| 2007/0211056 | A1 * | 9/2007 | Chakraborty et al. | 345/440 |
| 2007/0244783 | A1 * | 10/2007 | Wright et al. | 705/35 |
| 2009/0157630 | A1 * | 6/2009 | Yuan | 715/810 |
| 2009/0235152 | A1 * | 9/2009 | Rampson et al. | 715/207 |

OTHER PUBLICATIONS

Ray Lyons, "Best Practices in Graphical Data Presentation", Library Assessment Conference, Oct. 25-27, 2010 Baltimore MD, USA, pp. 208.*

Sanket Nadhani, "Selecting the Right Chart Type for your Data", Sep. 30, 2009, Tutorial9.net, pp. 16.*

Stephen Few, Effectively Communicating Numbers—Selecting the Best Means and Manner of Display, Nov. 2005, Proclarity Corporation, pp. 34.*

"Google Spreadsheets", Retrieved at << http://code.google.com/apis/visualization/documentation/spreadsheets.html >>, Retrieved Date: Sep. 28, 2010, pp. 1-5.

(Continued)

*Primary Examiner* — Chau Nguyen
(74) *Attorney, Agent, or Firm* — Alin Corie; Sandy Swain; Micky Minhas (57) ABSTRACT

Descried herein are various technologies to visualizing data in a spreadsheet application. Customized visualizations are generated by binding a user-defined equation with a parameter of a primitive visual shape that has been selected by the user to visualized a dataset. The user-defined equation takes as input a value of data in a cell of the spreadsheet application, and the primitive visual shape is displayed to the user as a function of the output of the user-defined equation.

20 Claims, 7 Drawing Sheets

(56) References Cited

OTHER PUBLICATIONS

"Using Oculus.NET for Your Business Data Visualization Solutions", Retrieved at << http://www.oculusinfo.com/papers/OculusDotNet_Whitepaper.pdf >>, Jan. 2008, pp. 1-18.

Jern, Mikael., "Visual Intelligence Turning Data into Knowledge", Retrieved at << http://ieeexplore.ieee.org/stamp/stamp.jsp?tp=&arnumber=781525 >>, Third International Conference on Information Visualisation, Jul. 14-16, 1999, pp. 1-7.

Streit, et al., "A Spreadsheet Approach to Facilitate Visualization of Uncertainty in Information", Retrieved at << http://www.cs.jhu.edu/~misha/ReadingSeminar/Papers/Streit07.pdf >>, IEEE Transactions on Visualization and Computer Graphics, vol. 14, No. 1, Jan. 2008, pp. 1-14.

Bostock, et al., "Protovis: A Graphical Toolkit for Visualization", Retrieved at << http://vis.stanford.edu/protovis/protovis.pdf >>, IEEE Transactions on Visualization and Computer Graphics, vol. 15, No. 6, Dec. 2009, pp. 1-8.

Anslow, et al., "Web Software Visualization via Google's Visualization API", Retrieved at << http://citeseerx.ist.psu.edu/viewdoc/download?doi=10.1.1.139.8450&rep=rep1&type=pdf >>, 2009, pp. 1-4.

Brath, et al., "Spreadsheet Validation and Analysis through Content Visualization", Retrieved at << http://www.oculusinfo.com/papers/SpshtContentViz-Eusprig06-Mar31-final.pdf >>, EuSpRIG, 2006, pp. 1-9.

Roth, et al., "Interactive Graphic Design Using Automatic Presentation Knowledge", Retrieved at << http://citeseerx.ist.psu.edu/viewdoc/download?doi=10.1.1.73.2921&rep=rep1&type=pdf >>, In Proceedings of the Conference on Human Factors in Computing Systems, 1994, pp. 1-6.

\* cited by examiner

GENERATING CUSTOMIZED DATA BOUND VISUALIZATIONS

BACKGROUND

Spreadsheet applications that are executable on computing devices currently allow a user to enter data into cells of such spreadsheet application and generate predefined visualizations based at least in part upon the data in the cells. Accordingly, the visualizations are data bound such that changes made to the underlying data in the cells can cause alterations in the resulting visualizations. These visualizations supported by conventional spreadsheet applications include relatively simple visualizations such as bar graphs, pie charts, scatter plots, amongst other charts or graphs.

If, however, the user wishes to generate a customized visualization for certain data, the options of the user are extremely limited. For example, the user can employ the current spreadsheet application to generate a basic visualization and then manually alter the visualization by adding graphical objects onto the visualization, if possible, to represent the data in the manner desired by the user. Other options for generating a customized visualization include generating a visualization from scratch utilizing specialized visualization languages. For instance, a user can create a visualization using Flash, Java, or other suitable visualization language. These visualization languages, however, require that the creator of the visualization have a great deal of knowledge of the underlying graphical primitives and geometry system. Furthermore, oftentimes these customized solutions are not bound to underlying data, and are not adaptable to other datasets.

SUMMARY

The following is a brief summary of subject matter that is described in greater detail herein. This summary is not intended to be limiting as to the scope of the claims.

Described herein are various technologies pertaining to generating customized visualizations in a spreadsheet application by binding at least one parameter of a primitive visual object with data by way of a user-generated equation. In other words, the user-generated equation can be bound to the at least one parameter of the primitive visual object. Additionally, described herein are technologies pertaining to an ability to save customized visualizations as templates, such that these customized visualizations can be readily utilized to visualize a non-identical dataset. Furthermore, these customized visualization templates can be modified to facilitate creation of still more customized visualizations.

In an example, a user may provide a spreadsheet application with a dataset, wherein the dataset can include multiple data points that are arranged in certain rows and/or columns. The user may wish to generate a customized visualization to allow such dataset to be visualized in a particular manner that is desired by the user. To undertake creation of a customized visualization, the user can select at least one primitive visual shape that is to be utilized to visualize the dataset. This primitive visual shape may be, for instance, a square, a circle, a diamond, a rectangle, etc. The user may then bind at least one parameter of the selected primitive visual shape to a user-generated equation (formula). The at least one parameter of the primitive visual shape may be color, size, position, etc. Thus, in an example the user may wish to generate a visualization in the form of a scatter plot such that the primitive visual shape is a circle. The user may further wish to define the size of such circle as a function of data in a dataset (e.g., radius equals data from column A over X). Therefore, the size of the primitive visual shape is bound to the aforementioned equation, and a visualization can be generated that includes the primitive visual shape displayed in accordance with such equation utilizing data in the dataset as input. Moreover, the binding of the parameter of the primitive visual shape can be generalized for other data elements, such that the generated visualization can include numerous instances of the primitive visual shape bound to the equation.

Furthermore, customized visualizations can be saved as templates, and the templates can be shared amongst users and/or accessed at a later point in time to visualize a different dataset. Continuing with the above example, the user may wish to save the binding of the size of the primitive visualization shape with the aforementioned equation. The user can save such binding in the form of a template, such that if the user wishes to visualize another set of data in a substantially similar manner, the user can access the saved template. Further, the user may share the template with a friend of such user such that the friend of the user can visualize data in the manner customized by the first user.

In another exemplary aspect, templates can also be nested to arbitrary levels. For example, a user can add company data to a spreadsheet that includes Yearly Sales and Profit data for a company over 10 years. The data that binds each unique year in the data can be combined with a top level template to create a visual table of charts. Each chart can be defined by a $2^{nd}$-level template, and all Sales & Profit data within the associated year. This nesting of data and templates can continue to additional levels.

Another use for the templates is for understanding visualizations (either written by another person, or by the same person at an earlier date). Because the template concisely represents how the data in mapped to visual elements, it can be analyzed to quickly ascertain how the visualization as built. Yet another use of these visualization templates is for teaching users how to build visualizations by examining how other visualizations are built.

Accordingly, the spreadsheet application can be configured to accept customized visualizations made by third parties, thereby allowing users to create a virtually infinite number of customized data visualizations for varying datasets. Moreover, the user that accesses the template may modify such template such that the visualization need not be made from scratch. Accordingly, a template generated by the first user may be employed by the second user to generate a further customized visualization.

Other aspects will be appreciated upon reading and understanding the attached figures and description.

DETAILED DESCRIPTION

Various technologies pertaining to generating and utilizing customized visualizations in a spreadsheet application will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

Figure 1:
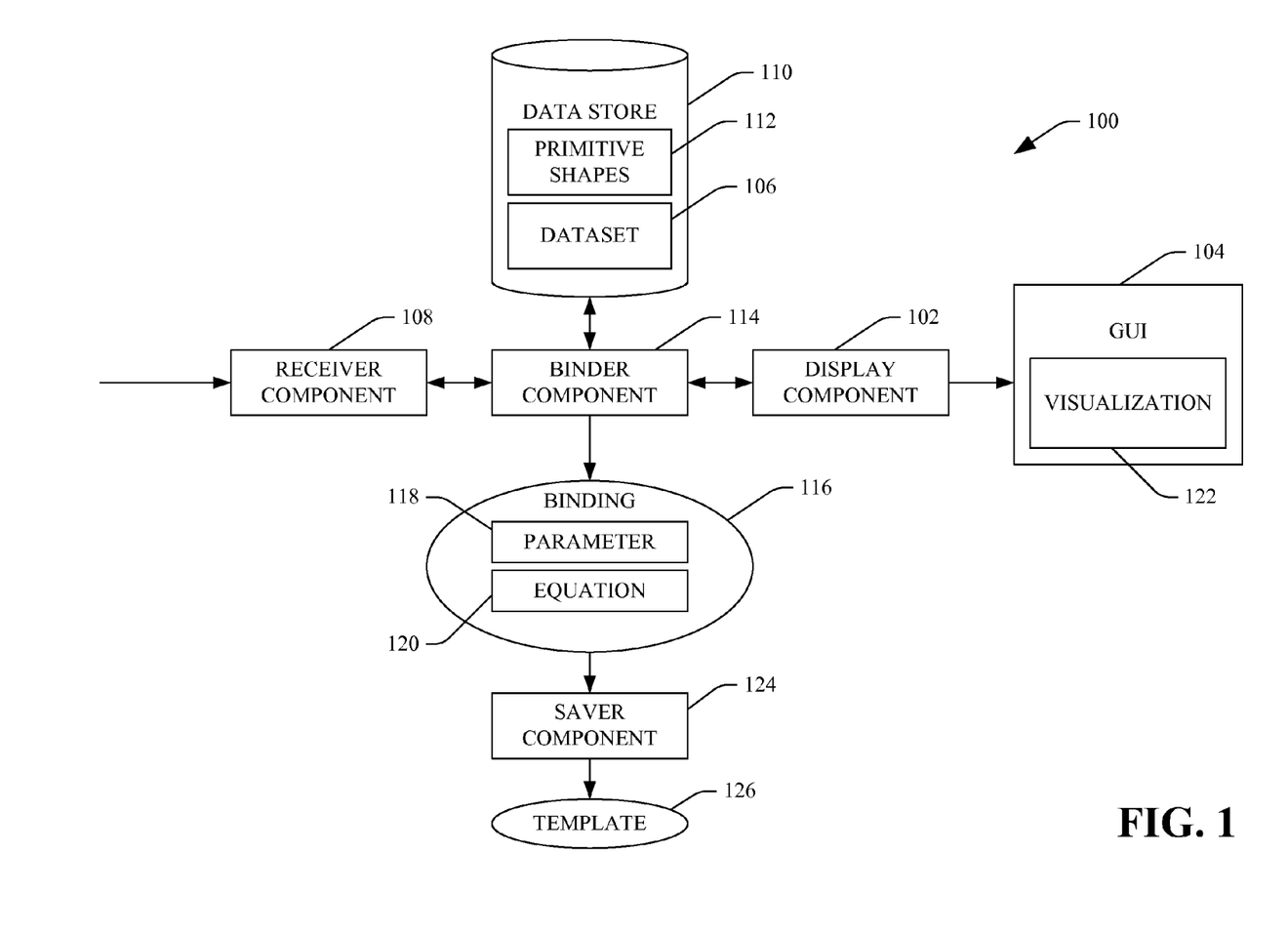
FIG. 1 is a functional block diagram of an exemplary system that facilitates generating customized visualizations for a particular dataset.

With reference to FIG. 1, an exemplary system 100 that facilitates generating a customized visualization with respect to a particular dataset is illustrated. In an example, the system 100 may be comprised by a spreadsheet application. The spreadsheet application can include a plurality of cells, wherein a user can assign values to cells in the spreadsheet application. Thus, the user can place certain values in a particular arrangement such as in certain rows or in certain columns presented in the spreadsheet application. Moreover, the spreadsheet application can be configured with functionality that allows binding of data entered into the spreadsheet application with a visualization. Some visualizations may be predefined in the spreadsheet application, such as relatively simple visualizations including but not limited to bar charts, scatter plots, pie charts, etc.

Furthermore, the system 100 can be executing on a client computing device such as a personal computer, laptop computer, a mobile telephone, a tablet computing device, etc. In another example, the system 100 may be executing on a server that is accessible to a user by way of a network connection. For instance, as indicated above, the system 100 may be comprised by a spreadsheet application. Such spreadsheet application can be executed on a server that is accessed by the user by way of a network connection. The spreadsheet application can be made available to the user by way of a network browser and the user can utilize the spreadsheet application as if it existed on her own personal computer. The user may save files or templates in the cloud or on her personal computing device.

The system 100 comprises a display component 102 that presents a graphical user interface 104 to a user. The system 100 further comprises a data store 110, which can be memory that is utilized to retain data pertaining to the spreadsheet application. The data store 110 comprises a dataset 106, wherein the data set 106 can be user-generated/user-defined. The graphical user interface 104 can include a plurality of cells, wherein such cells can be populated with values. Thus, the graphical user interface 104 can present the dataset 106 to the user, wherein the dataset 106 comprises a plurality of data points. The dataset 106 can be arranged in a manner that is customized by the user such as, for instance, in particular rows and/or in particular columns such that the dataset 106 is organized in a manner that is desired by the user. Contents of the dataset 106 can be altered by way of the graphical user interface 104 and/or by way of importing data from another source (e.g., another application).

The user may review the graphical user interface 104 and ascertain that she wishes to visualize at least a portion of the dataset 106 in the graphical user interface 104. The system 100 comprises a receiver component 108 that can receive an indication from a user that the user wishes to visualize at least a portion of the dataset 106. Visualization as used herein is intended to encompass generating a graphical representation of the dataset 106, such as in the form of a graph or chart. Pursuant to a particular example, the spreadsheet application can have a graphical button corresponding thereto that, when depressed, initiates a portion of the spreadsheet application that facilitates visualizing at least a portion of the dataset 106. When indicating that she wishes to visualize dataset 106, the user can indicate a particular type of visualization desired. The type of visualization can include selection of a particular type of predefined graphical chart such as a bar graph, a scatter plot, a series plot, a pie chart, etc. In selecting the type of graphical chart the user can (knowingly or unknowingly) indicate a primitive visual shape that she desires to include in the visualization of the at least a portion of the dataset 106. For instance, in the case of a bar chart, the primitive visual shape can be a rectangle. Similarly in the case of a scatter plot, the primitive visual shape may be a circle.

The data store 110 that also include a plurality of primitive visual shapes 112 that are supported by the spreadsheet application. These primitive visual shapes can include but are not limited to including a circle, a square, a diamond, a rectangle, an octagon, a pentagon, a hexagon, a trapezoid, a parallelogram, an oval, a triangle, a rhombus, an ellipse, a crescent, a heart, a star, a line, a curve (such as a spline, a Bezier), etc. Furthermore, a primitive visual shape, as used herein, can include combinations of two or more of the above-mentioned primitive visual shapes. Thus, any number of other primitive visual shapes may be included in the data store 110 and these types of primitive visual shapes are contemplated and intended to fall under the scope of the claims. In an example, available primitive shapes 112 can be presented to the user when the user selects a drop down menu. In another example, a popup window can be presented in the spreadsheet application, wherein after the user indicates that she wishes to visualize the dataset 106, a desired primitive visual shape from amongst primitive shapes 112 in the data store 110 can be selected from the popup window.

The receiver component 108 can further receive an indication from a user that the user wishes to bind at least one parameter of the primitive visual shape to an equation that is generated by the user. A parameter of the visual primitive shape can include size of the primitive visual shape, color of the primitive visual shape, desired location on a graph of the primitive visual shape, etc. Moreover, the equation generated by the user may be in a format that is consistent with a format utilized to define values in cells of the spreadsheet application. Thus, a user is familiar with commands of the spreadsheet application can readily generate an equation that can be bound to the at least one parameter of a selected primitive visual shape.

In an example, the equation can be a conditional equation. For instance, the user may wish that the primitive visual shape be a first color if the value of a data point in the dataset 106 is above a threshold, and be a second color if the value of a data point in the dataset 106 is at or below the threshold. In another example, the equation can indicate that a desired size of the primitive visual shape is a function of a value in a data point of the dataset 106. In still yet another example, the equation can indicate that a particular position on a certain axis that is desired for the primitive visual shape is a function of a summation of previous data points or other data points in the dataset 106. Still further, it is to be understood that the user may indicate that she wishes to bind different parameters of the primitive visual shape to different equations. Accordingly, it can be ascertained that a nearly infinite number of customized visualizations can be generated through utilization of the system 100.

A binder component 114 is in communication with the receiver component 108 and binds the at least one parameter of the selected primitive visual shape with the equation proffered by the user. The binder component 114 can then generate a binding 116 of the parameter 118 and the equation 120 generated by the user. Again, the parameter 118 may be size or color of the primitive visual shape, and the equation 120 can be bound to the parameter 118 to visualize the selected primitive visual shape.

The display component 102 can receive the binding 116 and can cause a visualization 122 to be presented on the graphical user interface 104 based at least in part upon the equation 120, the parameter 118 bound to the equation, and the one or more data points in the dataset 106 provided as input to the equation 120. The visualization 122 comprises the selected primitive visual shape displayed in accordance with the equation 120, the parameter 118, and the one or more data points in the data set 106 provided as input to the equation 120. Once the binding 116 is created, such binding 116 can be utilized to generate a visualization even when data in the dataset 106 is altered. For instance, if data in the dataset 106 is changed, the altered data can be provided to the equation 120, and the visualization 122 can be updated based at least in part upon the re-execution of the equation over changed data points in the dataset 106. Again, the change in data in the dataset 106 can occur from within the spreadsheet application (e.g., the user changes, adds, or deletes values in the dataset 106 via the graphical user interface 104) or external to the spreadsheet application (e.g., through an import of data from another source). For purposes of explanation, visualizations that can be generated through utilization of the system 100 are shown herein.

The system 100 can further comprise a saver component 124 that can save the binding 116 as a template 126 that can be later reused by the same user, shared with other users or sold on a marketplace. Thereafter, another user of another instance of the spreadsheet application can open the template 126 such that a customized visualization can be generated for a different dataset 106 in accordance with the template. This allows customized visualizations to be shared between users.

While the binding of a parameter of a primitive visual shape in a visualization has been described above, it is to be understood that such concept can be extended in a variety of manners. For example, a same parameter of a same primitive visual shape can be bound to different equations for display in a single visualization. Furthermore, different parameters of a primitive visual shape can be bound to different equations. Moreover, a visualization can include multiple different primitive visual shapes, wherein at least one parameter of each of the primitive visual shapes is bound to an equation or different equations. Still further, a single primitive can be bound to multiple equations, and multiple primitives can be bound to a single equation. Moreover, as mentioned above, a primitive shape can be a combination of shapes.

Figure 2:
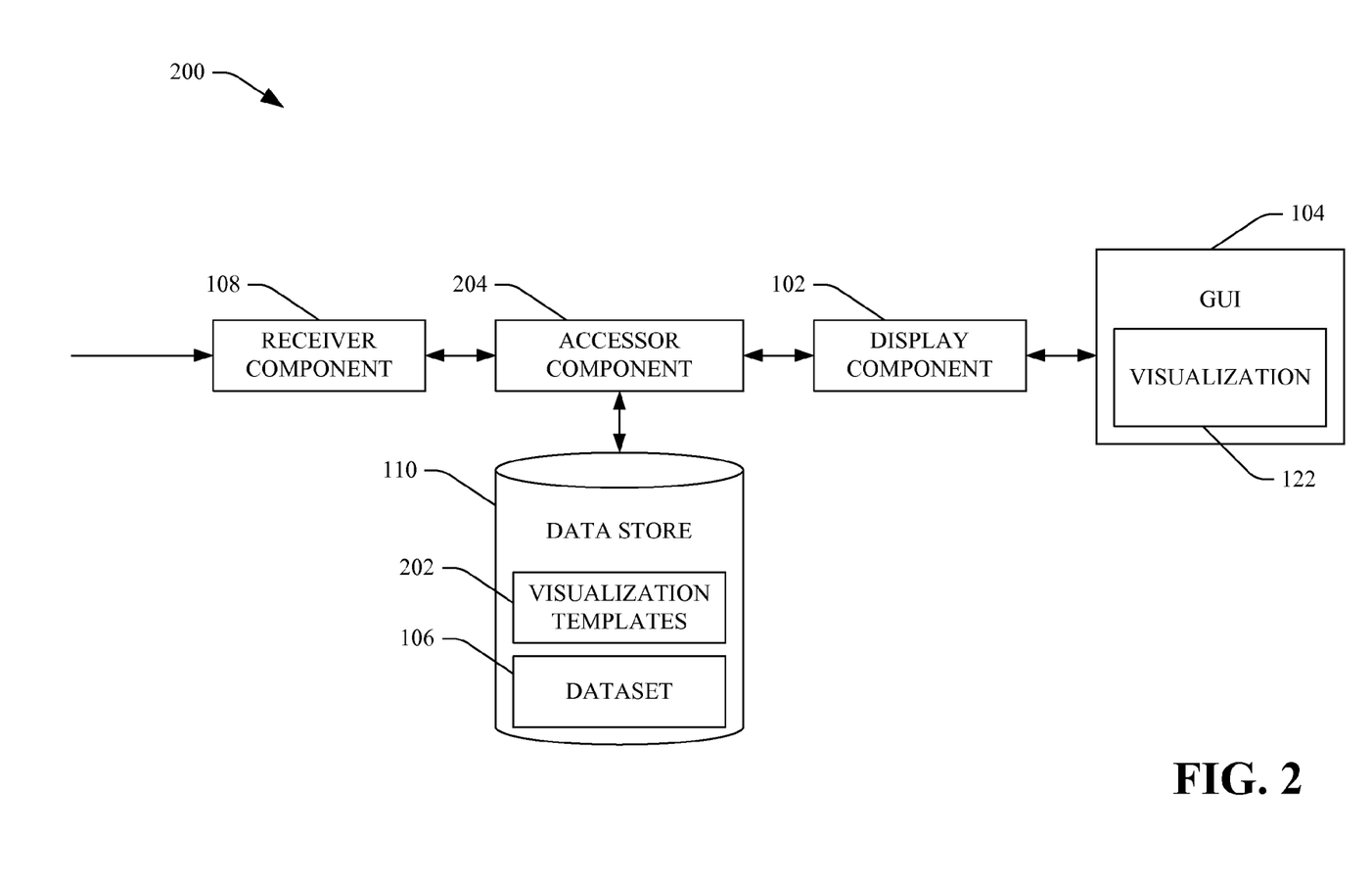
FIG. 2 is a functional block diagram of an exemplary system that facilitates selecting a third party visualization template to visualize a dataset.

Referring now to FIG. 2, an exemplary system 200 that facilitates accessing a third party customized visualization and utilizing such customized visualization on the dataset 106 is illustrated. The system 200 comprises the receiver component 108, the display component 102, and the graphical user interface 104, which can be as described above. The system 200 further comprises the data store 110, which includes a plurality of visualization templates 202. These visualization templates 202 can be customized visualization templates generated by third parties. As described above, these visualization templates 202 can include binding of an equation to at least one parameter of a primitive visual shape that is desirably utilized to visualize the dataset 106. The receiver component 108 can receive a request from the user to access a visualization template from the data store 110. For instance, the user can request to open a visualization template in the spreadsheet application through utilization of a drop down menu or a graphical button.

An accessor component 204 is in communication with the receiver component 108 and can access the data store 110 responsive to receiving the request from the receiver component 108 for a visualization template. The accessor component 204 may then access the data store 110 and retrieve the visualization template selected by the user. The spreadsheet application may then be loaded with the visualization template, which can be employed in connection with visualizing the dataset 106 in accordance with the visualization template. Moreover, the user can modify the retrieved visualization template to generate a new customized visualization, and can save such visualization as a new visualization template. For example, the user can choose to alter the equation that is bound to the at least one parameter of the primitive visual shape, and this change in the equation can result in a new customized visualization being created. Additionally, the user can choose to alter colors of shapes utilized in the template, alter types of shapes utilized in the template, etc. Thus, the user can alter existing templates to create new, customized visualizations for a dataset.

Figure 3:
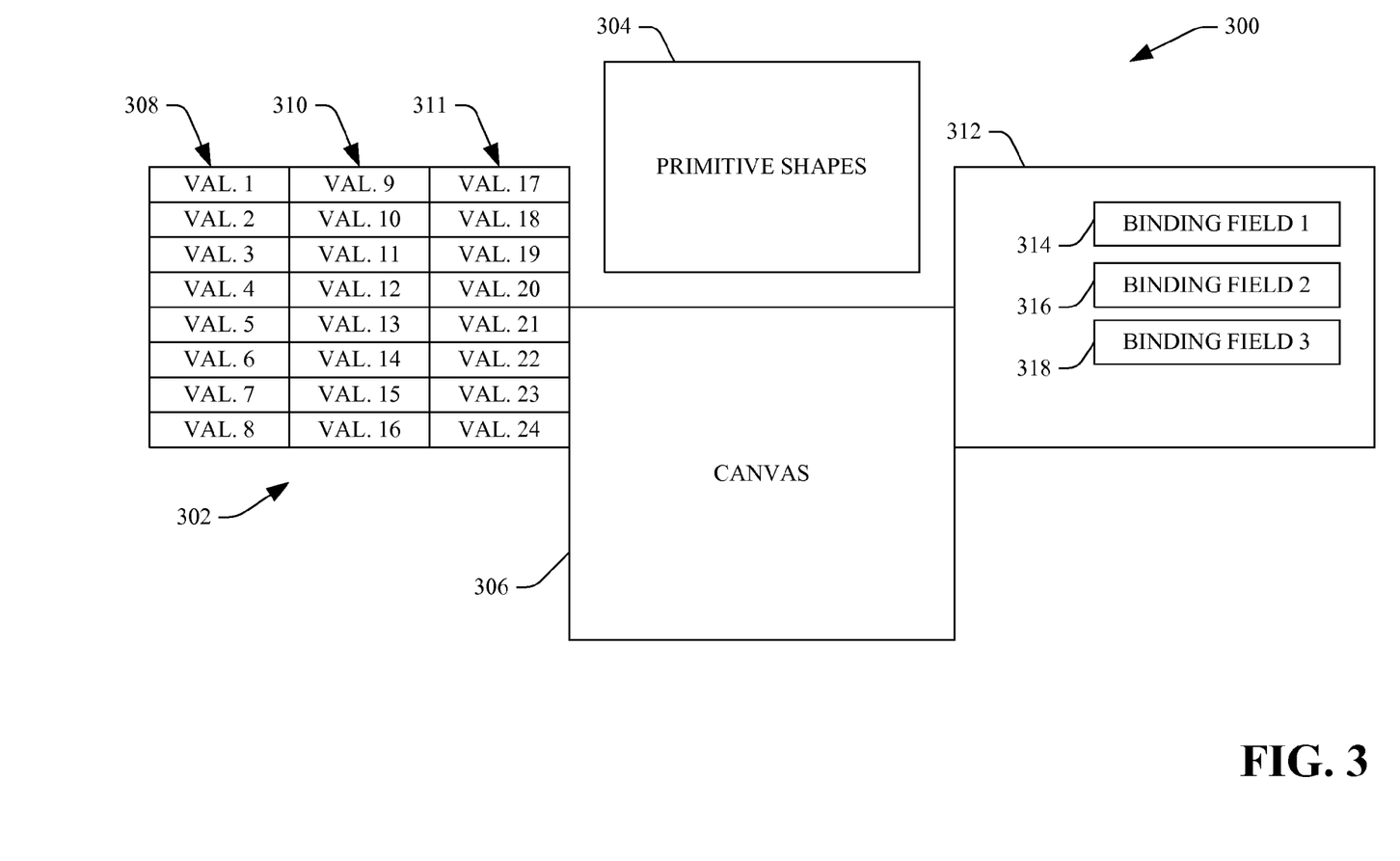
FIG. 3 is an exemplary graphical user interface that can facilitate generating a customized visualization in a spreadsheet application.

With reference now to FIG. 3, a graphical user interface 300 that facilitates generating a customized visualization for a dataset is illustrated. The graphical user interface 300 comprises a plurality of cells 302 that can be populated with various values. As shown in this example, the cells 302 include data in three columns and eight rows. It is to be understood, however, that data can be arranged in any suitable manner by the user in the cells 102.

The graphical user interface 300 can further comprise a window 304 that includes a plurality of selectable primitive visual shapes. Again, these shapes may include circles, squares, rectangles, etc. Additionally or alternatively, the window 304 can include a plurality of predefined visualization types such as bar graphs, pie charts, etc. and the primitive shapes can be included in such predefined visualization. The graphical user interface 300 can further comprise a canvas 306 that is configured to display visualizations to the user. In this example, the user can select a primitive visual shape from the window 304, which can cause an instance of the primitive visual shape to be displayed on the canvas 306. In another example, the user can initially select a general type of visualization that is desirably displayed on the canvas 306 and may thereafter select data from the cells 302 that accords to such desired visualization. For instance, if the user wished to generate a scatter plot with primitive visual shapes being displayed at locations defined by values in the first column and the second column of the cells, then the user can select such columns with a mouse tool and then select the desired visualization from the window 304. This can cause a basic visualization to be presented on the canvas 306.

It is to be understood that an order pertaining to generating a visualization is immaterial to the scope of the hereto-appended claims—that is, the user may first select a primitive visual shape and thereafter select a graph type corresponding thereto or may first select a graph type and thereafter further customize such visualization.

The graphical user interface 300 can further comprise a customization field 312 where the user can bind data in the cells 302 to the visualization and can further bind an equation to at least one parameter of the selected primitive visual shape. For instance, the values in the first column may be X axis values and the values in the second column may be Y axis values, and the user can, through the customization field 312, bind data in these columns with respective positions on the X and Y axis of a visualized graph. This can cause primitive visual shapes to be presented on the canvas 306 at X-Y coordinates corresponding to values in the first and second columns. Further, the customization interface 312 can comprise a plurality of binding fields 314-318 that the user can employ to bind data to particular parameters of the primitive shapes. Additionally, the user can employ at least one of the binding fields 314-318 to bind an equation to at least one parameter of a primitive visual shape. The binding of the at least one visual shape shown in the canvas 306 to an equation specified in one of the binding fields 314 through 318 can allow a customized visualization to be displayed on the canvas 306. The equation can, for example, receive as input at least one of the values in the cells 302, and the parameter of the primitive visual shape can be defined based at least in part upon the output of the equation. Thereafter, the primitive visual shape can be displayed on the canvas 306 based at least in part upon the binding of the user-generated equation with the at least one parameter of the primitive visual shape.

Figure 4:
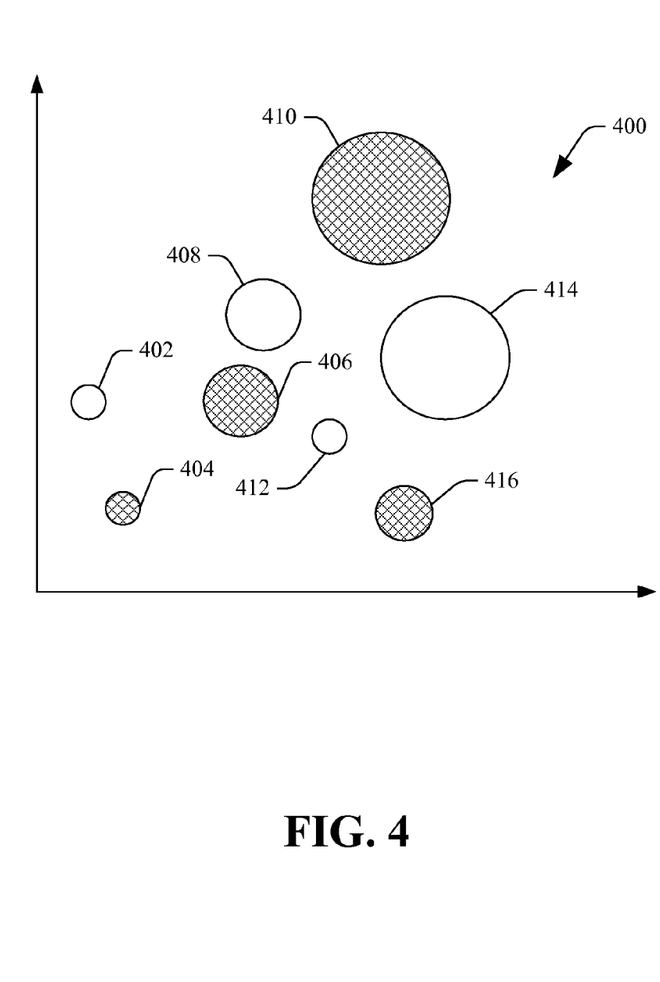
FIG. 4 is an exemplary visualization of a dataset.

Turning now to FIG. 4, an exemplary customized visualization 400 that can be generated by way of the system 100 and/or through utilization of the graphical user interface 300 is illustrated. In this example, the visualization 400 is a customized scatter plot. As shown, the scatter plot 400 comprises eight different primitive visual shapes 402-418 of varying sizes and two different colors. In this example, the scatter plot 400 can represent a dataset that includes a first column of data that represents average salaries of employees in different countries, a second column of data that represents a number of individuals residing in the respective different countries who are overweight, and a third column can represent populations of the respective different countries. The user can choose to have a scatter plot generated, wherein primitive visual shapes are shown based upon binding values in the first column to an X-axis and binding values in the second column to a Y-axis. Thus, shapes in the visualization 400 indicate average salaries for certain countries with respect to a number of overweight individuals that reside in such countries.

The user may wish, however, to perform a more detailed visualization such that a reviewer thereof can obtain further information simply by reviewing the visualization 400. For instance, the user may indicate that they wish that the size of the primitive visual shapes 402-418 be a function of the population corresponding to the different countries. This can be done through an equation that is bound to the parameter "size" of the primitive visual shapes 402-418. For instance, the user can define, through an equation, that the size of the primitive visual shapes is to be the population of the different countries (data in the third column) divided by some defined value. Accordingly, a reviewer of the visualization 400 can ascertain, for a particular country, an average salary of an employee in that country with respect to a number of overweight individuals that reside in the country relative to the population of such country.

Furthermore, the user may wish to present still more information in the visualization 400. For example, for a particular country, the user may wish to indicate or visualize countries represented in the visualization 400 as being healthy countries if a percentage of the population that is overweight is beneath a threshold. Thus, primitive visual shapes corresponding to a country where the percentage of those residing in such countries is not overweight can be displayed in a first color and other shapes can be displayed in a second color. The user can cause this to be visualized by binding the color of the primitive visual shapes to an equation that divides data points in the aforementioned second column by data points in the aforementioned third column.

Figure 5:
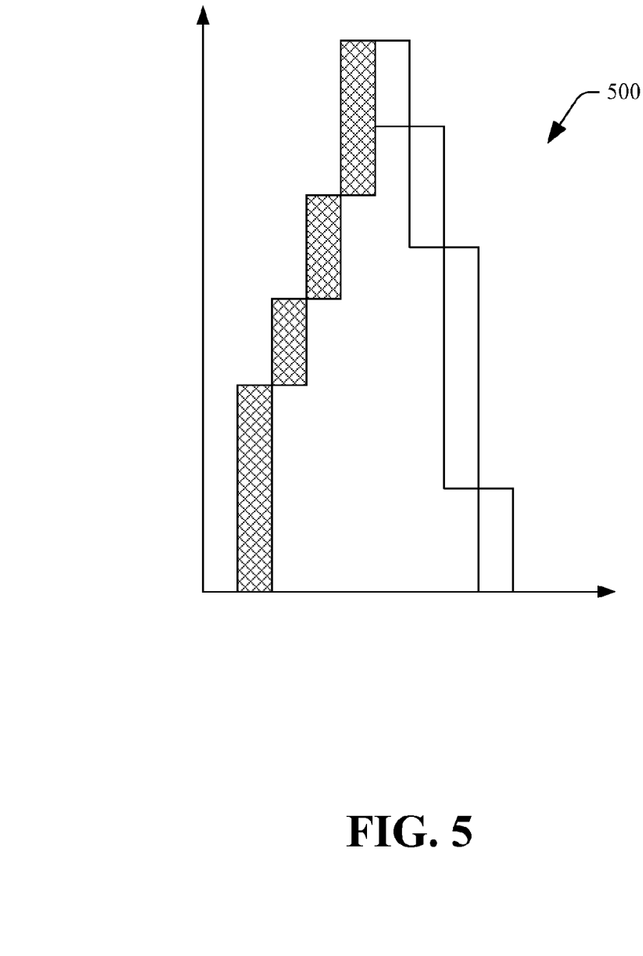
FIG. 5 is an exemplary visualization of a dataset.

Now referring to FIG. 5, yet another exemplary customized visualization 500 is illustrated. The visualization 500 can be generated, for example, to visualize elevation change of a user during a trip taken by such user. In this example, the primitive visual shapes are rectangles and the visualization 500 comprises a plurality of such primitive visual shapes 502-516. For instance, this visualization 500 can be based on the following dataset. A first column that represents a day number of the trip (there were eight days in the trip visualized in the visualization 500) and a second column that comprises values that are representative of elevation changes of the user during the trip corresponding to the days in the first column. To generate such visualization, the individual can select a bar graph as desirably being utilized to visualize such data and can thereafter generate a user defined equation to customize such visualization. For instance, the user may wish that primitive visual shapes be a first color if the elevation changed during the course of a day was positive, while the primitive visual shapes be a second color if the elevation changed for the particular day was negative. Accordingly, color of the primitive visual shapes 500 can be bound to a conditional equation, wherein the condition is whether the elevation change was positive or negative. If the elevation change was positive, the primitive visual shapes are colored a first color and if the elevation change was negative, the primitive visual shapes are colored with a second color. From reviewing the visualization 500, it can be ascertained that the elevation change corresponding to days 1-4 were positive while the elevation change corresponding to days 5-8 were negative.

Furthermore, the user can choose to bind the position of the primitive visual shapes to be a summation of elevation changes in the data. Accordingly, rather than each primitive visual shape beginning at position 0 on the Y-axis in the visualization 500 and extending upwards, the user can bind the start position of the primitive visual shapes to a summation equation that causes the start position of the primitive visual shapes to be customized. The result is the customized visualization 500 which can provide the user with a richer visualization than what is otherwise available.

Figure 6:
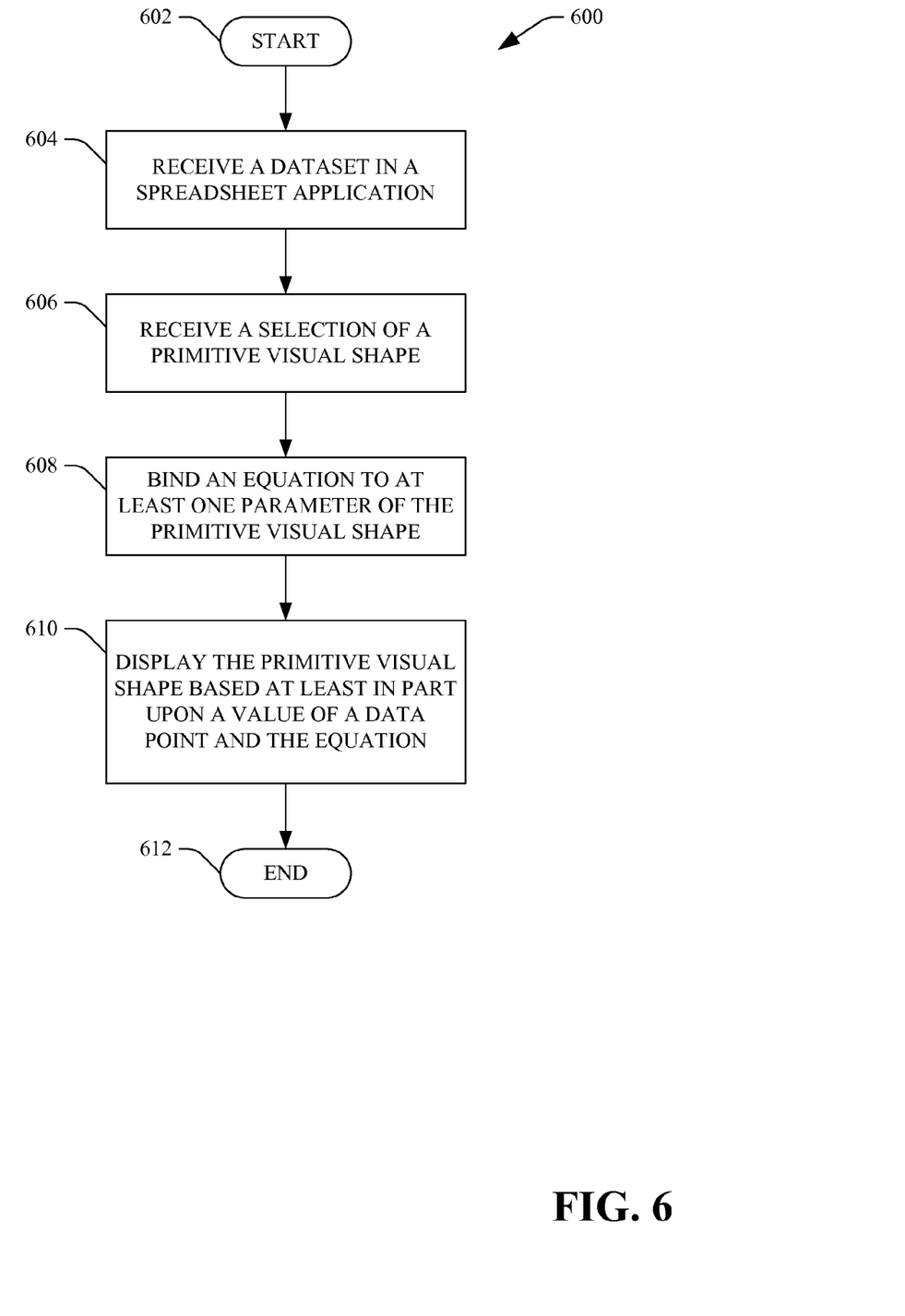
FIG. 6 is a flow diagram that illustrates an exemplary methodology for displaying a primitive visual shape based at least in part upon a user defined equation that is bound to a parameter of the primitive visual shape.
Figure 7:
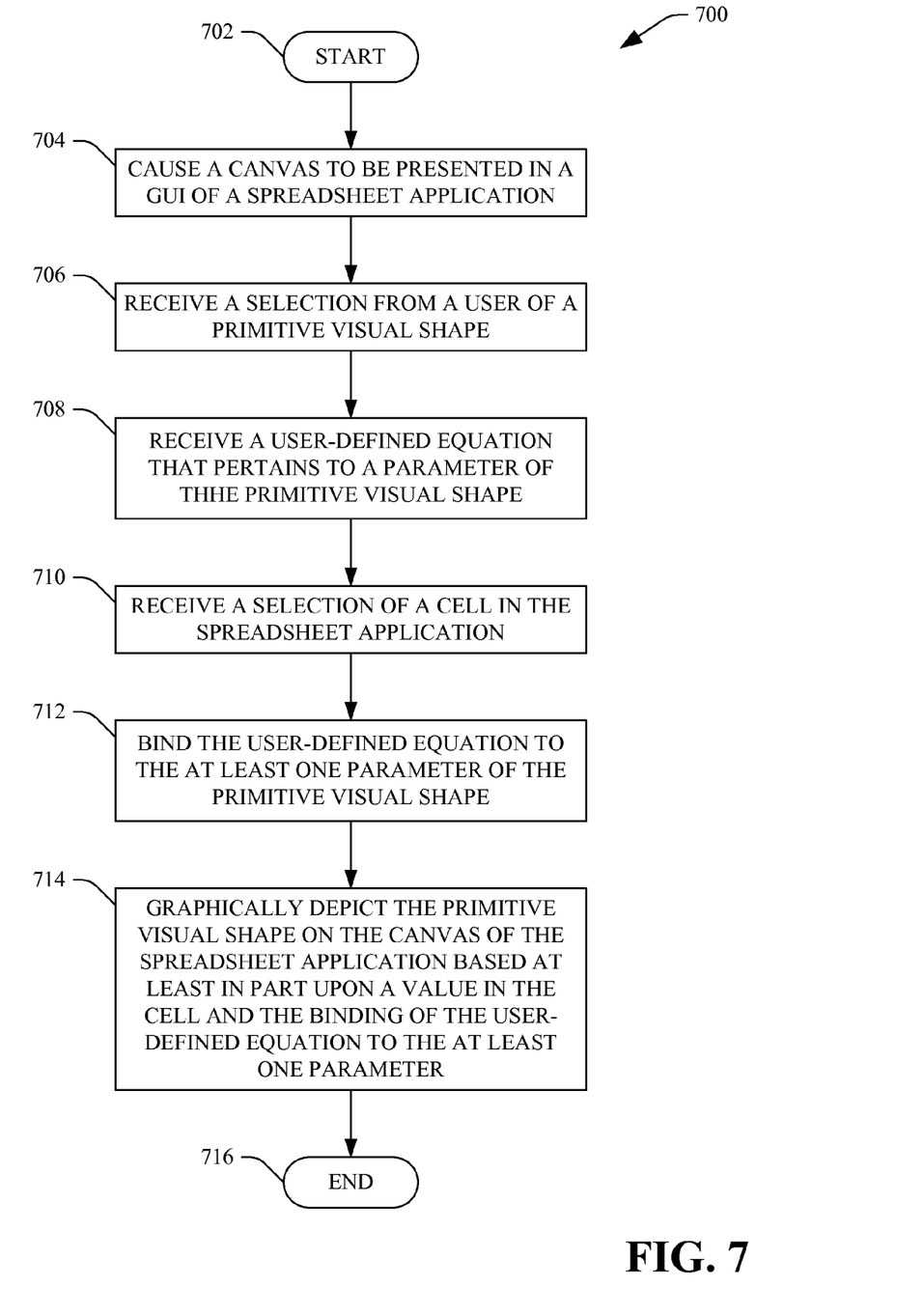
FIG. 7 is a flow diagram that illustrates an exemplary methodology for graphically depicting a primitive visual shape in a spreadsheet application based at least in part upon an equation bound to the primitive visual shape.

With reference now to FIGS. 6 and 7, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

Now referring to FIG. 6, a methodology 600 that facilitates displaying a primitive visual shape based at least in part upon an equation bound to a parameter of the primitive visual shape is illustrated. The methodology 600 begins at 602, and at 604 a dataset in a spreadsheet application is received. For example, the dataset can comprise a plurality of data points that are arranged in different columns in a logical manner.

At 606, a selection of a primitive visual shape or a visual shape group (containing multiple primitives and possibly other visual shape groups and possibly nested groups) is received from a user, wherein such selection can be the primitive visual shape from a pull down menu, may be selection of a particular type of graph desired by the user, wherein such graph includes the primitive visual shape, etc. The primitive visual shape selected by the user can desirably correspond to at least one data point in the dataset received at 604.

At 608, an equation is bound to at least one parameter of the primitive visual shape, wherein the equation can utilize the value of the at least one data point in the dataset as an input. Thus, output of the equation is a function of the at least one data point. At 610, a processor is caused to display the primitive visual shape on the display screen of the computing device in the spreadsheet application based at least in part upon a value of the at least one data point in the equation that is bound to the at least one parameter of the primitive visual shape. It is to be understood that the equation can take as input multiple data points in a dataset, and the primitive visual shape can be displayed as a function of the output for an equation; for example, size, position, etc. of the primitive visual shape can be based at least in part upon the output of the user defined equation.

As indicated above, this binding of the equation in the at least one parameter of the primitive visual shape can be saved as a template that can be accessed by the user at a later point in time with respect to a different dataset or can be shared with another user such, that the other user can visualize a different dataset using the customized visualization of the template. In another embodiment, a marketplace is envisioned, where creators of customized visualizations can offer certain visualizations for sale to interested third parties. A user wishing to visualize the data in a particular manner can access the marketplace and purchase a customized visualization template from over the Internet. The spreadsheet application can be employed to load and support these third party generated customized visualizations and can visualize data utilizing the aforementioned template. Moreover, users can access templates and make further modifications to bindings between equations and parameters of primitive visual shapes, thereby generating new custom visualizations that are based on previous customized visualizations. The methodology 600 completes at 612.

With reference now to FIG. 7, an exemplary methodology 700 that facilitates graphically depicting a primitive visual shape on a canvas displayed in a spreadsheet application is illustrated. The methodology 700 starts at 702, and at 704 a canvas is caused to be presented to a user in a graphical user interface of a spreadsheet application. This canvas can be displayed together in a spreadsheet application with one or more cells that comprise values.

As 706, a selection from a user of a primitive visual shape is received. For instance, a pull down menu can comprise a plurality of available primitive visual shapes and the user can select a desired primitive visual shape through utilization of the pull down menu. This can cause, for example, the selected primitive visual shape to be graphically depicted in the canvas presented at 704. The user may then, for instance, select the primitive visual shape on the canvas through utilization of a mouse. In an example, the user can right click on the primitive visual shape in the canvas, which can cause a customization interface to be presented to the user, wherein the user can customize display of the primitive visual shape with respect to the data of the user in the spreadsheet application. Accordingly, at 708, a user-defined equation can be received that pertains to at least one parameter of the primitive visual shape. For instance, the user-defined equation can correspond to size of the primitive visual shape, color of the primitive visual shape, position to be displayed in the canvas of the primitive visual shape, etc.

At 710, the user-defined equation is bound to the at least one parameter of the primitive visual shape. Thus, when displayed in the canvas, the parameter of the primitive visual shape is a function of the output of the equation. Accordingly, for instance, color of the primitive visual shape, size of the primitive visual shape, etc. may be a function of the output of the equation bound to the corresponding parameter of the primitive visual shape.

At 712, a selection of a cell in the spreadsheet application is received from the user, wherein the cell has at least one value stored therein. At 714, the primitive visual shape is graphically depicted on the canvas of the spreadsheet application based at least in part upon the value in the cell and the binding of the user defined equation to the at least one parameter of the primitive visual shape. In other words, the value in the cell can be utilized as input to the user defined equation and the output of the user defined equation can control the parameter of the primitive visual shape. The methodology 700 completes at 716.

Figure 8:
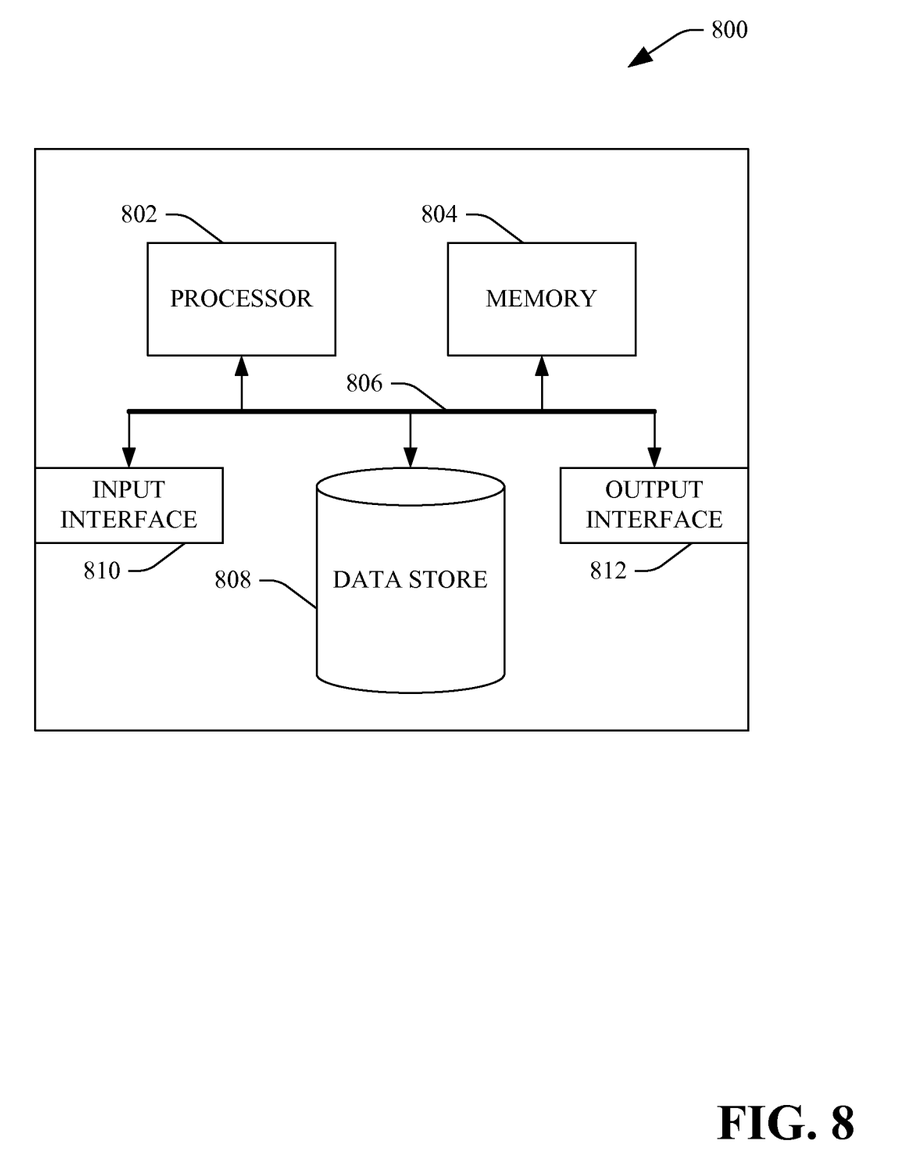
FIG. 8 is an exemplary computing system.

Now referring to FIG. 8, a high-level illustration of an exemplary computing device 800 that can be used in accordance with the systems and methodologies disclosed herein is illustrated. For instance, the computing device 800 may be used in a system that supports generating customized visualization for a particular dataset. In another example, at least a portion of the computing device 800 may be used in a system that supports utilizing a template generated by another to visualize a dataset in a spreadsheet application. The computing device 800 includes at least one processor 802 that executes instructions that are stored in a memory 804. The memory 804 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store user defined equations, primitive visual shapes.

The computing device 800 additionally includes a data store 808 that is accessible by the processor 802 by way of the system bus 806. The data store 808 may be or include any suitable computer-readable storage, including a hard disk, memory, etc. The data store 808 may include executable instructions, primitive visual shapes, chart types, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method, comprising:
   in a computer-implemented spreadsheet application, receiving a dataset, the dataset comprises a plurality of data points;
   receiving a selection of a primitive visual shape, an instance of the primitive visual shape is to visually represent a data point in the dataset, the primitive visual shape has a parameter that at least partially defines appearance of the primitive visual shape;
   responsive to receiving the selection, binding a user-defined equation to the parameter of the primitive visual shape, such that outputs of the user-defined equation define how the parameter of the primitive visual shape is to appear when respective instances of the primitive visual shape visually represent data points in the data set;
   executing the user-defined equation using a second data point in the dataset as input to the user-defined equation, such that a value is computed based upon the second data point;
   assigning the value to the parameter of the instance of the primitive visual shape that is to visually represent the data point; and
   displaying the instance of the primitive visual shape on a display of a computing device in the spreadsheet application, the instance of the primitive visual shape displayed to represent the data point and to visually indicate that the parameter has the value.

2. The method of claim 1, further comprising:
   prior to receiving the selection of the primitive visual shape, receiving a selection of a visualization type, the visualization type is a graph or chart; and
   receiving the selection of the primitive visual shape based upon the selection of the visualization type.

3. The method of claim 1, further comprising:
   subsequent to receiving the selection of the primitive visual shape, receiving a selection of a visualization type, wherein the visualization type is a graph or chart, wherein displaying the instance of the primitive visual shape comprises displaying the instance of the primitive visual shape in the visualization type.

4. The method of claim 1, the parameter is size, color, or position of the primitive visual shape.

5. The method of claim 1, the primitive visual shape is one of a circle, a square, a diamond, a rectangle, an octagon, a pentagon, a hexagon, a trapezoid, a parallelogram, an oval, a triangle, a rhombus, an ellipse, a crescent, a heart, a star, a curve, or a line.

6. The method of claim 1, the user-defined equation is a conditional equation, and the value assigned to the parameter is computed based upon whether a condition in the conditional equation is satisfied.

7. The method of claim 1, further comprising:
   storing the binding of the user-defined equation to the parameter of the primitive visual shape as a template, the template when stored is accessible for subsequent uses of the spreadsheet application.

8. The method of claim 1, further comprising:
   saving the binding of the equation to the parameter of the primitive visual shape as a template;
   receiving a request to access the template in the spreadsheet application;
   receiving at least one other data point that resides in a second data set in the spreadsheet application;
   executing the user-defined equation using the at least one other data point at input to the user-defined equation, such that a second value is computed based upon the at least one other data point;
   assigning the second value to the parameter of a second instance of the primitive visual shape; and
   utilizing the template to display the second instance of the primitive visual shape to indicate that the second instance of the primitive visual shape has been assigned the second value.

9. The method of claim 1, wherein the spreadsheet application is executing on a server computing device and is accessible by way of a network connection.

10. The method of claim 1, further comprising:
    receiving an indication that the primitive visual shape is to represent multiple data points in the data set; and
    causing a plurality of instances of the primitive visual shape to be displayed in the graphical user interface, the plurality of instances respectively representative of the multiple data points, wherein each of the instances of the primitive visual shape is assigned a respective value for the parameter based upon the user-defined equation bound to the parameter, and wherein two instances of the primitive visual shape appear differently based upon respective outputs of the user-defined equation.

11. The method of claim 1, further comprising causing the binding of the user-defined equation to the parameter of the primitive visual shape to be provided to an online marketplace as a purchasable template, wherein the template is purchasable by way of the online marketplace.

12. The method of claim 1, wherein the user-defined equation is expressed in a format that is consistent with a format utilized to define values for data points in cells presented in a graphical user interface of the spreadsheet application.

13. A system comprising:
    a processor; and
    memory storing instructions that, when executed by the processor, cause the processor to perform acts:
    receiving a plurality of indications with respect to a spreadsheet application, the spreadsheet application has a spreadsheet loaded therein that is displayed on a display, the spreadsheet comprises:
    a first data point; and
    a second data point, the plurality of indications comprising:
    a first indication that a parameter of a primitive visual shape is to be bound to a user-generated equation, wherein when the parameter of the primitive visual shape is bound to the user-generated equation, outputs of the user-generated equation define how the parameter of the primitive visual shape is to appear when instances of the primitive visual shape are displayed to visually represent data points in the spreadsheet; and a second indication that the second data point is to be provided as an input value to the user-generated equation, an output value of the user-generated equation that is based upon the input value is assigned to the parameter of an instance of the primitive visual shape that is to represent the first data point; and displaying a visualization on the display based upon the first indication and the second indication, the visualization comprises the instance of the primitive visual shape, the instance of the primitive visual shape represents the first data point in the visualization, the instance of the primitive visual shape displayed in the visualization to indicate that the output value has been assigned to the parameter of the instance of the primitive visual shape.

14. The system of claim 13, the acts further comprising generating a binding between the user-generated equation and the parameter of the primitive visual shape responsive to receiving the first indication.

15. The system of claim 14, the acts further comprising saving the binding as a visualization template responsive to receiving an indication to save the binding.

16. The system of claim 13 comprised by a server that is accessible to a client computing device that comprises the display by way of a network connection.

17. The system of claim 13, the parameter is one of size, color, or position of the primitive visual shape.

18. The system of claim 13, the user-generated equation is a conditional equation, and the parameter of the instance of the primitive visual shape is assigned the output value as a function of whether a condition of the conditional equation is satisfied.

19. A computer-readable memory device storing instructions that, when executed by a processor, cause the processor to perform acts comprising:
causing a canvas to be presented in a graphical user interface of a spreadsheet application;
receiving a selection of a primitive visual shape in the spreadsheet application, the primitive visual shape selected to represent a data point in a dataset loaded in the spreadsheet application;
receiving a user-defined equation, wherein the user-defined equation pertains to a parameter of the primitive visual shape;
responsive to receiving an indication that the user-defined equation is to be bound to the parameter of the primitive visual shape, binding the user-defined equation to the parameter of the primitive visual shape, such that respective outputs of the user-defined equation at least partially define how the parameter of the primitive visual shape will appear when instances of the primitive visual shape represent data points in the dataset;
receiving a selection of a cell in the spreadsheet application, wherein the cell has a particular value therein;
responsive to receiving the selection of the cell in the spreadsheet application, executing the user-defined equation using the particular value as an input to the user-defined equation such that the user-defined equation generates an output value that is based upon the particular value; and
displaying a visualization on the canvas of the spreadsheet application, the visualization comprises an instance of the primitive visual shape, the instance of the primitive visual shape represents the data point and is displayed to indicate that the output value has been assigned to the parameter.

20. The computer-readable memory of claim 19, the parameter being one of size of the primitive visual shape, color of the primitive visual shape, or location on the canvas of the primitive visual shape.

* * * * *